Figure 1:
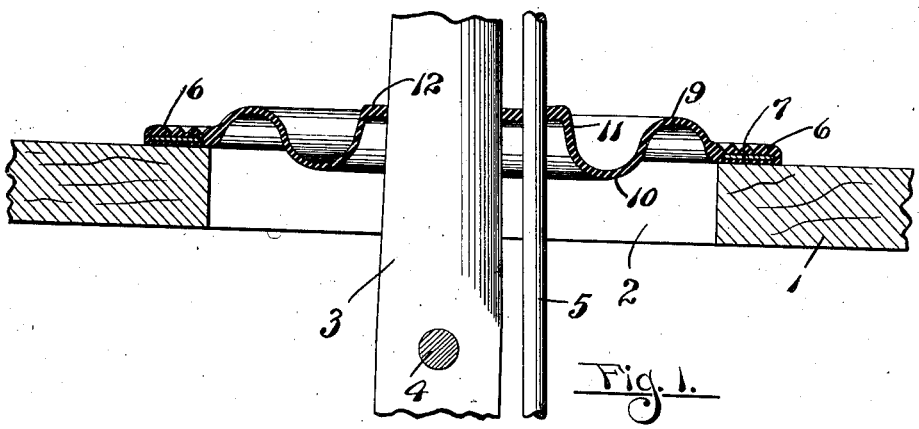

Sept. 20, 1932. J. F. DUFFY 1,878,440
EMERGENCY BRAKE PAD
Filed Dec. 1, 1930

Inventor
James Francis Duffy
By
Livermore and
Van Antwerp
Attorneys

Patented Sept. 20, 1932

1,878,440

UNITED STATES PATENT OFFICE

JAMES FRANCIS DUFFY, OF HOLLAND, MICHIGAN, ASSIGNOR TO DUFFY MANUFACTURING COMPANY, OF HOLLAND, MICHIGAN, A CORPORATION OF MICHIGAN

EMERGENCY BRAKE PAD

Application filed December 1, 1930. Serial No. 499,288.

This invention relates to a pad for use in covering the opening through a floor board through which an emergency brake lever of an automobile passes. The pad may be used to cover openings for other levers or the like and is not necessarily limited in use to emergency brake levers, though the embodiment of the invention which has been made and is illustrated in the drawing is one which has been used on automobiles with such levers.

It is a primary object and purpose of the present invention to provide a covering pad of a simple yet very practical and effective construction which can be applied over the usual handle structure at the upper end of a brake lever, being capable of stretching for such purpose and which may then be slid downwardly lengthwise of the lever to the floor board and secured to the board, covering the opening through the floor board which is far greater size than the cross sectional area of the lever and yet have the pad engage the sides of the lever and also of the dog releasing rod which extends lengthwise of the lever, and at the same time have sufficient flexibility that in the movements of the lever back and forth between its released and its set positions, there will be no interference with the lever nor any disturbing of the snug engagement of the pad with the lever. The opening through the floor board is thus completely covered and the passage of dirt or other foreign material through the floor board downwardly to the automobile mechanism is obviated.

An understanding of the invention may be had from the following description, taken in connection with the accompanying drawing, in which, Fig. 1 is a fragmentary vertical section illustrative of the use of the pad of my invention in conjunction with an emergency brake lever.

Figure 2:
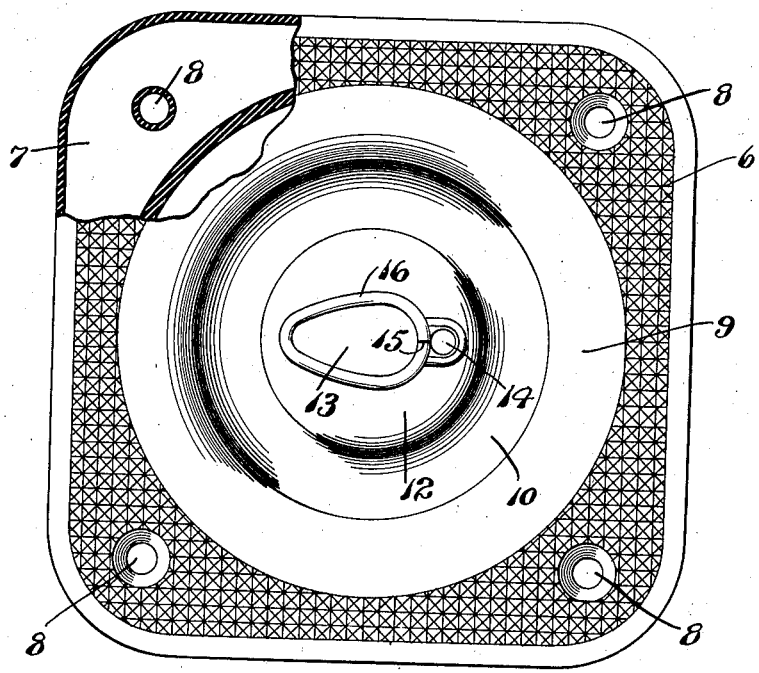
Figure 3:
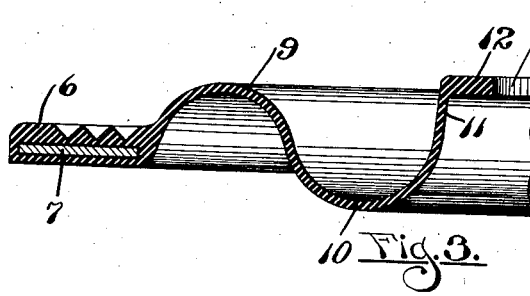

Fig. 2 is a plan view of the covering pad, a part at one corner thereof being broken away for disclosure of the interior construction, and Fig. 3 is a fragmentary enlarged vertical section through the pad at one side thereof.

Like reference characters refer to like parts in the different figures of the drawing.

The floor board of the front or driving compartment of a motor vehicle, indicated at 1, may have an opening 2 through it for the upward passage of a brake lever 3, pivotally mounted to turn about a pivot 4, the axis of which is located a short distance below the lower side of the floor board 1. An emergency brake lever is ordinarily provided with a wire or rod 5 extending alongside of the same which in turn at its lower end is connected with a dog engageable with a ratchet for holding the lever in its operative position, while at the upper end of the brake lever the wire is connected to a releasing handle all of which is common and well known.

The invention of covering pad which I have made comprises a rubber plate 6, preferably of substantially square outline, which has a flat metal plate 7 molded therein between its upper and lower sides, the plate 7 being substantially coextensive with the outer edges of the rubber plate 6 but having a large circular opening at its inner side of substantially the same or of a slightly greater diameter than the opening 2 in the floor board. Screw passage openings 8 are made adjacent the corners of the plate for fastening the pad to the floor board.

Within the outer portions of the plate 6 of the pad the rubber from which it is made is extended first in an upward and then a downward curve making an annular rib 9 concaved at its outer side, from which the rubber extends downwardly and inwardly and then upwardly and inwardly in a reverse curve, forming an inner annular trough 10, the inner vertical side 11 of which joins with a horizontal central integral section 12 in which two openings 13 and 14 are made, as best shown in Fig. 2. The larger opening 13 is of a shape corresponding to the cross sectional area of the lever 3, while the smaller circular opening 14 corresponds to the cross section of the rod 5; and the two openings are spaced apart in correspondence to the distance that the lever 3 and the rod 5 are separated. The rubber between the adjacent sides of the openings is cut as indicated at 15, making a communicating slit between them, and in practice the edges of the opening may be formed into upwardly extending beads 16 for the purpose of reinforcing the rubber around the openings so that the rubber will not tear readily in service or when the pad is applied.

The handle of the lever 3 and also the operating hand grip at the upper end of the lever which is used to actuate the rod 5 are considerably greater in cross section than the cross sectional area of the lever and rod where the pad is to engage therewith. The inner flexible portions of the pad are made of a good grade of vulcanized soft rubber which is readily stretched and is of a very yieldable nature. In placing the pad over the emergency brake lever the openings at 13 and 14 may be greatly enlarged by stretching so that the pad may be passed downwardly over the handle and to the floor board. When the pad has reached its position immediately above the floor board it is then secured in place by screws and the rubber around the openings 13 and 14 fits snugly against the sides of the lever 3 and rod 5.

In swinging the lever 3 about its pivot 4 that part of the lever whch is engaged by the horizontal section 12 of the pad is moved with the lever but by reason of the double reverse curve or corrugated construction of the parts 9 and 10 described, such movement with the lever takes place readily without stretching the rubber where it engages against the lever and there is no opening of any space or spaces between the sides of the lever and the adjacent edges of the rubber around it.

The article described is one of practical utility and has proved exceptionally satisfactory in use. The invention is defined in the appended claims and is to be considered comprehensive of all forms of structure coming within their scope.

I claim:

1. A device of the class described comprising, a horizontal central section of rubber having an opening therethrough, an integral alternate annular trough and upwardly extending concaved rib surrounding the central portion, and a surrounding marginal portion of rubber around said trough and rib having a reinforcing member of stiff material molded therein between its opposite sides, said horizontal central section being approximately in the plane of said marginal portion.

2. In combination with a member having translatory movement, a relatively flat stiff base having an opening therethrough, said member having a portion located substantially in the plane of the opening, and a flexible element extending between the edges of the opening through the base and abutting against the said member, said flexible element having one or more corrugations therein for the purpose described and lying in the same plane as the said flat base.

3. An article of manufacture having a base portion, a central portion having an opening, said base portion and said central portion being in substantially the same plane, and a corrugated flexible portion connecting the said base portion to the said central portion.

4. An article of manufacture as set forth in claim 3 in which a metal plate is inserted in said base portion to strengthen the same.

5. An article of the class described comprising a metal plate having a large opening therethrough, rubber molded around said plate to form a base portion, a central portion having an opening therethrough, said rubber extending integrally from said base portion to connect onto the said central portion, said rubber extension having a corrugated cross section for the purpose described and said base portion being in substantially the same plane as the said central portion.

In testimony whereof I affix my signature.

JAMES FRANCIS DUFFY.